Oct. 2, 1962  R. G. LAWSON  3,056,197
METHOD OF MAKING COUPLING FERRULES
Filed Feb. 17, 1960

INVENTOR
Richard G. Lawson
BY
H. F. Johnston
ATTORNEY

United States Patent Office 3,056,197
Patented Oct. 2, 1962

3,056,197
METHOD OF MAKING COUPLING FERRULES
Richard G. Lawson, Waterbury, Conn., assignor to Scovill Manufacturing Company, New Haven, Conn., a corporation of Connecticut
Filed Feb. 17, 1960, Ser. No. 9,262
3 Claims. (Cl. 29—552)

This invention is an improved method of making threaded coupling sleeves or ferrules such as used in splicing garden hose or attaching a hose to another coupling.

With the introduction of plastic hose for sprinklers and the like, it has been that general practice in attaching the hose to a coupling or mender to first insert a nipple with a bulbous end into the hose and then screw a tapered sleeve or ferrule over the hose material to bind the hose against the bulbous portion of the nipple.

In the past, due to the fact that the ferrule was formed with a tapered interior thread and with a knurled exterior cylindrical surface for manipulating the same, the ferrule was always made as a screw machine product which was wasteful of the material used—the process being time-consuming and expensive.

It is the object of this invention to provide a new method of making a tapered threaded ferrule with manipulating exterior ribs from sheet metal with little waste of material and in a more economical and efficient manner.

Another object is to provide an improved ferrule that is light in weight and better suited to use on plastic hose.

These and various other objects are attained by the method hereinafter described and illustrated in the accompanying drawing, in which.

Figure 1:
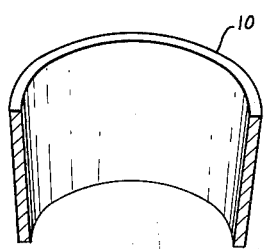
FIG. 1 is a sectional perspective view of half of a tapered eyelet shell as it appears before being re-formed as a completed interior threaded ferrule with manipulating ribs in accordance with my invention.
Figure 2:
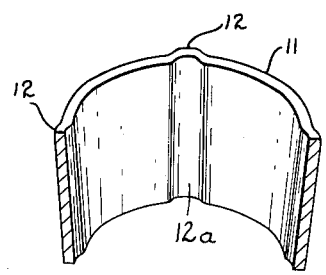
FIG. 2 is a similar view showing the first step in the operations of forming longitudinal manipulating ribs upon the shell.
Figure 3:
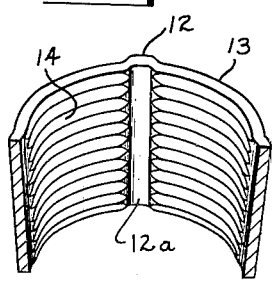
FIG. 3 is a similar view showing the shell as it appears after the threading operation.

Referring now to the drawing, FIGS. 1 to 3 illustrate the various steps in producing the tapered threaded ferrule with manipulating ribs wherein FIG. 1 shows a plain tapered sleeve or shell 10 open at both ends.

The shell 10 is subjected to a ribbing operation in producing a tapered shell 11 having equally spaced longitudinal ribs 12 formed outwardly of its wall as shown in FIG. 2, which ribs are provided for gripping purposes when manipulating the ferrule.

FIG. 3 shows the completed ferrule 13 having threads 14 formed on its interior surface in between the ribbed sections 12.

In performing the above operation, I prefer to use a conventional dial press having two plunger stations. Such a dial press is well-known in the art, and it is considered sufficient to refer to only the principal working parts of the press, such as a support table 8 on which a dial plate 15 is intermittently rotated and a plunger ram 16 positioned thereabove.

Figure 4:
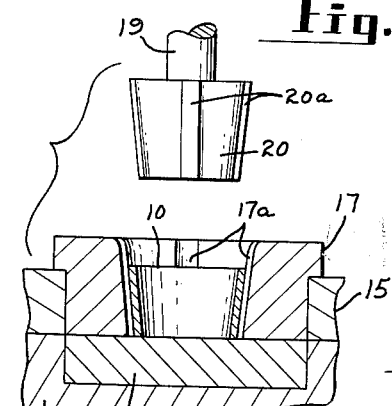
FIG. 4 is a sectional and side view of the essential part of the tools for ribbing the shell.

FIG. 4 shows the tools at the first plunger station where a ribbing die 17 is fitted into a suitable socket in the dial plate 15 and lines up with an anvil disc 18 recessed in the support table 8. The die 17 is formed with longitudinal channels 17a into which the material of the shell 10 is forced for forming the outwardly pressed longitudinal ribs 12. Above the ribbing die 17 is positioned a ribbing punch 19 having a conical head 20 and a plurality of equally spaced longitudinal ribs 20a projecting outwardly of its conical surface and complemental to the channels 17a in die 17.

Figure 6:
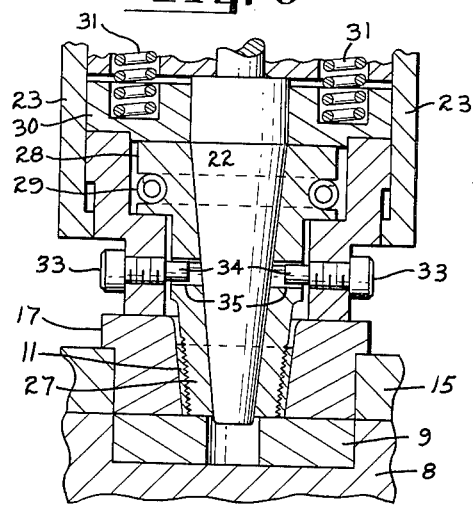
FIG. 6 is a similar view showing the tool in thread-forming position.
Figure 5:
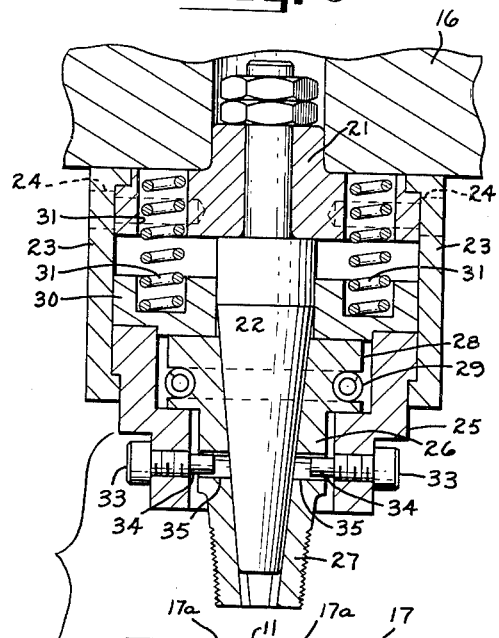
FIG. 5 is a sectional view of the thread-forming tools as they appear before the threading operation.

It will be understood that at a feeding station prior to the rib-forming station of FIG. 4, the conical tapered shell 10 of FIG. 1 will have been fed into the die 17. After the dial plate 15 has conveyed the ribbing die 17 to the rib-forming station of FIG. 4, the punch 19 will descend and the conical head 20 and forming ribs 20a will be forced downwardly into the shell 10 and thus forcing outwardly the longitudinal ribs 12 into the tapered shell 11 and simultaneously forming grooves 12a on the interior surface of the shell such as shown in FIG. 2. After the ribbing operation, the ribbing punch 19 will be withdrawn leaving the ribbed shell 11 in the die 17. The dial plate 15 will then be rotatably indexed and carry with it the ribbed shell 11 and die 17 to the threading station such as illustrated in FIGS. 5 and 6. In this position, the die 17 will be lined up with an apertured anvil disc 9 recessed in the support table 8.

The thread-forming tool consists of a mandrel support block 21 suitably secured to the underside of the ram 16 and having a tapered mandrel 22 attached thereto. The block 21 is preferably rectangular shape and has a pair of guide plates 23 attached to opposite sides thereof as by screws 24. Slidably carried at the lower end of the plates 33 is a die retainer housing 25 within which is mounted for radial movement, a set of split thread-forming dies 26. The lower end of the dies are formed with a recess collar 28 for receiving a coil spring 29 serving to tension said dies radially inwardly about the tapered mandrel 22.

The split dies 26 are confined within the housing 25 by a cap 30. The split dies 26, housing 25 and cap 30 are slidable axially as a unit between the guide plates 23 and normally urged downwardly by a set of coil springs 31 tensioned between the cap 30 and the adjacent face of the ram 16, the springs passing through suitable clearance holes 31 in the mandrel support block 21.

To prevent relative twisting of the thread-forming dies 26 within the housing 25 and to assure that the splits between the dies will be properly indexed relative to the channels 17a in the ribbing die 17, the housing 25 carries a set of screws 33 having guide pins 34 slidable in suitable apertures 35 in the split threading dies 26.

In the operation of the second plunger station, after the dial plate is indexed to bring die 17 into axial alignment with said station, the ram 16 will descend first to a position where the lower end of dies will abut the anvil plate 9 and the lower end of housing 25 will abut the upper surface of the die 17 which will thus properly locate the threaded sectors 27 of the split dies to the ribbed shell 11 in die 17. Continuous downward movement of the ram will cause the tapered mandrel 22 to force the split dies 26 radially outwardly and thus by an outward compressive force form threads into the interior surface of the shell 11 between the previously formed interior grooves 12a in the manner as shown in FIG. 6. After the thread-forming operation, the threading tools will ascend and the dial plate 15 will be indexed to another station where the completed shell 13 may be ejected from the die 17 by a knock-out punch (not shown) in the usual manner.

According to my invention, the split threading dies 26 are placed in the ribbed and grooved shell 11 with the threaded sectors 27 aligned with the portions of the shell 11 between the ribs 12. Thus, when the die threaded sectors are expanded, the spaces between them will register with the internal grooves 12a in said shell resulting from the formation of the ribs 12.

Figure 7:
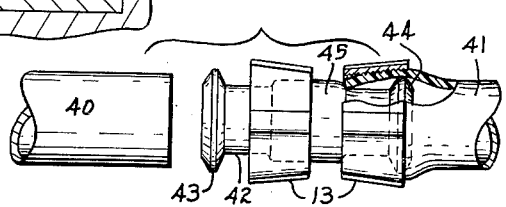
FIG. 7 is a side view showing one of the uses of the tapered threaded ferrule made according to my method.

FIG. 7 shows the manner in which the ferrules made according to my invention may be employed in joining the ends of two hose pieces together. In making such a union of two hose pieces 40 and 41, an interior nipple 42 is provided having opposite bulbous ends 43 and 44 and a central enlarged portion 45. Two ferrules 13 are used to make the joint and they initially may be positioned upon the central enlarged portion 45. In making an assembly, the hose pieces are slipped over the bulbous ends 43 and 44 to a position where they are stopped by the central enlarged portion 45. The nipples are then forced over the ends of the hose by a screwing operation to a position as shown at the right of FIG. 7.

One of the advantages in making a coupling ferrule according to my method is that in clamping or pressing the threads into the interior wall of the ferrule, the shell is hardened to give it added strength and the threads have a much smoother surface as compared to threads that are cut into a shell. By leaving stamped threads in the ferrule makes it much easier to assemble the ferrule upon a hose in that the ferrule is self-threading upon the hose material and a stamped thread offers less resistance in the threading operation.

What I claim is:

1. The method of forming a tapered internally threaded ferrule for use with a hose coupling which comprises first forming a tapered shell of sheet material open at both ends, then forming a plurality of equally spaced longitudinal ribs outwardly of the sidewall of said shell and throughout substantially the entire length of said shell, and finally radially pressing threads in the tapered inner wall of said shell between the longitudinal ribs.

2. The method of forming a tapered internally threaded ferrule with external longitudinal ribs which comprises first forming a tapered shell of sheet material open at both ends, positioning said shell into a tapered die having longitudinal channels in its wall and forcing a tapered punch with longitudinal ribs into said shell for forcing ribs outwardly of the shell wall into said die channels and throughout substantially the entire length of said shell, and finally inserting a tapered threading split-die into said ribbed shell and expanding said split-die outwardly to radially impress a threaded surface into the tapered interior surface of the ribbed shell.

3. The method of forming a tapered internally threaded ferrule with external longitudinal ribs which comprises first forming a tapered shell of sheet material open at both ends, positioning said shell into a tapered die having longitudinal channels in its wall and forcing a tapered punch with longitudinal ribs into said shell for forcing ribs outwardly of the shell wall into said channels while simultaneously forming grooves on the interior surface of said shell, said ribs and grooves extending throughout substantially the entire length of the shell, and finally inserting a tapered threading split-die into said ribbed shell, with the die sections aligned with the portions of the shell between the ribs, and expanding said split-die outwardly to radially impress a threaded surface into the interior surface of the ribbed shell between the grooves.

References Cited in the file of this patent

UNITED STATES PATENTS

| | | |
|---|---|---|
| 164,764 | Rhind | June 22, 1875 |
| 210,784 | King et al. | Dec. 10, 1878 |
| 411,156 | Lewis | Sept. 17, 1889 |
| 465,957 | Willmott | Dec. 29, 1891 |
| 629,245 | Frank | July 18, 1899 |
| 2,401,834 | Liddicoat | June 11, 1946 |